Patented Jan. 15, 1946

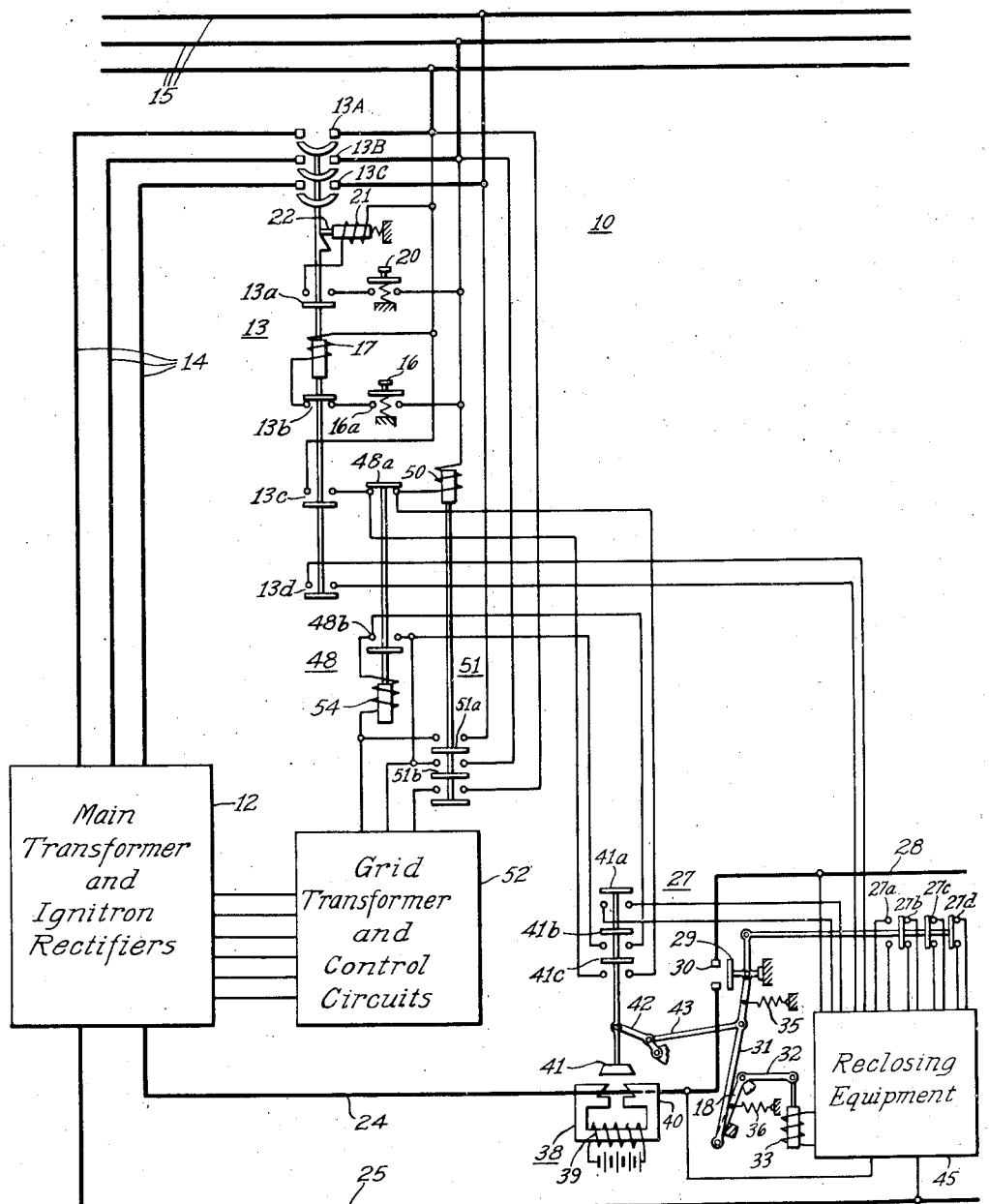

2,393,061

UNITED STATES PATENT OFFICE 2,393,061

CONTROL SYSTEM

Maurice E. Reagan, Pittsburgh, Pa., assignor to Westinghouse Electric Corporation, East Pittsburgh, Pa., a corporation of Pennsylvania Application August 15, 1944, Serial No. 549,552

7 Claims. (Cl. 175—363)

My invention relates, generally, to control systems and has reference, in particular, to rectifier control systems.

Generally stated, it is an object of my invention to provide a rectifier system that is simple and inexpensive to manufacture, and is certain and reliable in operation.

More specifically, it is an object of my invention to prevent destructive arcing of the direct-current circuit breaker in controlled arc discharge rectifier systems.

It is also an object of my invention to provide for removing the excitation of a controlled rectifier at or before the instant the direct-current circuit breaker opens, so as to prevent arcing of the direct-current circuit breaker.

Another object of my invention is to provide for removing the excitation of an excitation-controlled rectifier as soon as the direct-current circuit breaker commences to open in response to a fault condition, and to prevent reclosure of the circuit breaker until the excitation has been first completely removed and then reapplied.

Yet another object of my invention is to provide for preventing reclosure of a direct-current circuit breaker in the output circuit of an excitation-controlled rectifier until the excitation circuit thereof has first been definitely deenergized.

Still another object of my invention is to provide an energizing circuit for the rectifier excitation switch as soon as the excitation circuit is first deenergized, and prevent interruption of the energizing circuit until the direct current or cathode circuit breaker is closed.

In practicing my invention, auxiliary contacts of the direct-current cathode circuit breaker, which open at or before the instant the main contacts open, are used to deenergize the excitation switch and interrupt the excitation circuit of the rectifier. The cathode circuit breaker is thereby relieved from interrupting the usual power arc. An auxiliary relay connected on the control electrode side of the excitation switch prevents energization of the excitation circuit subsequent to opening of the cathode circuit breaker until the excitation circuit has been completely deenergized, and then provides an energizing circuit therefor until the cathode circuit breaker again closes.

For a more complete understanding of the nature and objects of my invention, reference may be made to the following detailed description, which may be read in connection with the accompanying drawing, in which the single figure is a diagrammatic view of a controlled mercury arc rectifier system embodying the invention in one of its forms.

Referring to the drawing, the reference numeral 10 may denote, generally, a rectifier system comprising, a rectifier of the controlled type designated, generally, by the enclosure 12 in order to omit unnecessary circuits and equipment and to simplify the drawing. An alternating-current circuit breaker 13 may be provided for connecting the input circuit of the rectifier 12, which may be represented by the conductors 14, to a source of alternating current such as the conductors 15 through main contact members 13A, 13B and 13C. Control of the circuit breaker 13 may be effected in any suitable manner by means of manual or automatic equipment such as is well known in the art. For the purpose of simplifying the drawing, the closing means may be represented by a push buttom switch 16 which may be provided for energizing the operating winding 17 of the circuit breaker. Means such as the additional push button switch 20 may be provided for energizing the trip winding 21 associated with the latch means 22 for opening the circuit breaker.

The output circuit of the rectifier 12, represented by the conductors 24 and 25, may be connected to a suitable direct-current load circuit by means of a cathode or direct current circuit breaker 27 which connects the output circuit conductor 24 to a load circuit conductor 28. The circuit breaker 27 may be of any suitable type such as that disclosed by Patent No. 1,669,546 granted to C. Aalborg on May 15, 1928 and assigned to the assignee of the present application. In this instance the circuit breaker 27 comprises a moving contact member 29 mounted on a support member 31 for bridging stationary contact members 30. The support member 31 is pivotally connected to a bell crank operating member 32 disposed to be actuated by a closing solenoid 33. Operating springs 35 and 36 are connected to the members 31 and 32 for operating the support member 31. A holding electromagnet 38 is provided having an operating winding 39 for normally providing a magnetic flux in the core member 40, for retaining an armature 41 which may be operatively connected to a pivotal lever 42 which may be connected intermediate the ends of the support member 31 by means of a lever 43.

Tripping of the circuit breaker 27 may be effected as described in detail in the Aalborg patent by releasing the armature 41 in any suitable manner. In the present instance the conductor 24 is disposed to provide a single turn about the core member 40. When the current in the conductor 24 exceeds a predetermined value, the flux produced thereby in the core member 40 opposes the flux produced by the operating winding 39, thereby releasing the armature 41.

Control of the circuit breaker 27 may be effected by suitable control means such as, for example, the automatic reclosing equipment represented by the enclosure 45. Since the present invention is not particularly concerned with details of the reclosing equipment, all details of the circuits and connections thereof have been omitted from the present drawing in the interest of simplification.

A reclosing equipment of the type commonly used in such applications may be represented by the system shown in Fig. 1 of Patent No. 2,249,870, which issued on July 22, 1941, to W. R. Taliaferro, and is assigned to the assignee of the present application.

The connections made to the reclosing equipment 45 through auxiliary contact members 27a, 27b, 27c, and 27d may represent the circuit provided in the Taliaferro patent by contact members 162, 82, 36 and 130, respectively. Additional connections have been made to the reclosing equipment through auxiliary contact members 13d of the alternating-current circuit breaker with a view of initiating operation of the reclosing equipment as soon as the alternating-current circuit breaker recloses. Additional connections have also been made to the reclosing equipment to auxiliary contact members 41a of the circuit breaker 27. These contact members are arranged to open at the instant or just before the main contact members 30 of the circuit breaker and serve to render the closing means inoperative as soon as the circuit breaker 27 closes.

In order to prevent destructive arcing at the main contact members 29 and 30 of the direct-current or cathode circuit breaker 27, means may be provided for interrupting the excitation circuit of the rectifier 12. This may be accomplished by deenergizing the operating winding 50 of an excitation control switch 51, which controls the connection of the grid transformer and excitation control circuits 52 of the rectifier 12 to a source of excitation, as soon as the circuit breaker 27 commences to open.

For example, contact members 41c may be used to interrupt the energizing circuit of the operating winding 50. A control relay 48 may be provided for initially setting up the energizing circuit. By connecting the operating winding 54 of the control relay on the load side of the excitation switch 51, the control relay 48 may be maintained in the operating position so long as the excitation of the control circuits is maintained in any appreciable degree. By providing for energizing the operating winding 54 of the control relay 48 through contact members 41b of the cathode circuit breaker 27 and contact members 51a and 51b of the switch 51, the energizing circuit of the excitation switch 51 will be insured until the circuit breaker 27 closes so as to prevent removal of the excitation from the control circuits 52 before the circuit breaker 27 closes.

Since the operating winding 54 of the control relay 48 is energized so long as there is any appreciable energization of the control circuits for the rectifier 12, the control switch 51 may not be reclosed after the circuit breaker 27 opens, until the control circuits are completely deenergized. Since the reclosing equipment depends upon the existence of the proper direct-current potential between the conductors 24 and 25, the circuit breaker 27 cannot, therefore, be reclosed until the rectifier 12 has been first rendered completely nonconductive.

In operation, the circuit breaker 13 may first be closed by operating the switch 16 to close its contact members 16a and energize the operating winding 17 through contact members 13b of the circuit breaker. The excitation switch 51 is thereupon energized through contact members 13c of the circuit breaker 13 and contact members 48a of the control relay 48. The control switch 51 closes, connecting the control circuits 52 to the conductor 15, rendering the rectifier 12 conductive and providing a direct current voltage between the output circuit conductor 24 and 25.

Since contact members 13d of the circuit breaker close when the circuit breaker 13 closes, the reclosing equipment 45 is thereby connected to effect closure of the circuit breaker 27 whenever the voltage of the conductors 24 and 25 and the operating conditions of the load circuit are in the proper predetermined relation. As soon as the circuit breaker 27 closes, the control relay 48 is energized through an energizing circuit extending through contact members 41b of the circuit breaker 27. The excitation switch 51 is thereby maintained in the energized position by a circuit extending through contact members 41c of the circuit breaker 27.

Should a fault occur on the direct-current load circuit, the armature 41 of the holding mechanism is released. The reclosing circuit for the operating winding 54 of the control relay is interrupted by contact members 41b opening. The control relay remains in a closed position, however, due to a holding circuit through contact members 48b, so long as the excitation switch 51 remains closed, or so long as any appreciable current flows in the excitation circuit. At the same time, contact members 41c of the circuit breaker 27 open, interrupting the energizing circuit for the operating winding 50 of the excitation switch 51. The excitation switch 51 opens, disconnecting the rectifier control circuit from the source so that the output circuit of the rectifier is deenergized at or before the instant the contact members 30 of the circuit breaker 27 disconnect the load circuit therefrom. Destructive arcing of the main contact members 29 and 30 of the cathode circuit breaker 27 is thereby prevented.

Since the control relay is connected on the control electrode side of the excitation switch 51, reclosure of the excitation switch 51 is not possible until the control relay 48 returns to the deenergized position. When it does, an energizing circuit is again provided for the operating winding 50 and excitation may be reapplied to the rectifier control circuits 52. The reclosing equipment 45 may then be effective to reconnect the output circuit of the rectifier to the load circuit as soon as the voltage of the output circuit and the operating conditions of the load circuit regain the desired predetermined relations. The control relay 48 thereupon is reenergized and interrupts the closing circuit of the excitation switch 51.

From the above description and the accompanying drawing it will be apparent that I have provided, in a simple and effective manner, for insuring against arcing of the cathode circuit breaker in control rectifier switching systems. By utilizing a control relay in the above-described manner, the excitation may be readily removed from the rectifier control circuits as soon as or before the cathode circuit breaker opens. Reclosure of the cathode circuit breaker is effectively prevented until the excitation has been first completely removed from the control circuits.

Since certain changes may be made in the above-described arrangement, and different embodiments of the invention may be made without departing from the spirit and scope thereof, it is intended that all the matter contained in the above description and shown in the accompanying drawing shall be considered as illustrative and not in a limiting sense.

I claim as my invention:

1. In a rectifier switching system, a rectifier having a control electrode and input and output circuits, an alternating-current circuit breaker for connecting the input circuit to an alternating-current source, a cathode circuit breaker for connecting the output circuit to a load circuit, switch means operable under the control of the cathode circuit breaker to disconnect the control electrode from a source of excitation, and control means responsive to energization of the control electrode for preventing reclosure of the switch means until control electrode is completely deenergized.

2. For use with a rectifier having an input circuit with a circuit breaker for connecting said circuit to an alternating-current source, an output circuit with a cathode breaker for connecting said circuit to a direct-current load circuit, and a control electrode with switch means for connecting it to a source of excitation, circuit means associated with the cathode breaker for effecting opening of the switch means before the cathode breaker opens, and control means operable while the control electrode is energized to prevent reclosure of the switch means.

3. For use in a control system for a mercury pool arc discharge rectifier having an input circuit with a circuit breaker for connecting it to an alternating-current source, an output circuit with a cathode circuit breaker for connecting it to a direct-current load circuit and a control electrode energizable to render the rectifier unidirectionally conductive, switch means operable to effect energization of the control electrode, means including auxiliary contact members associated with the cathode circuit breaker for rendering the switch means inoperative when the main contact members of the cathode breaker open, reclosing means responsive to conditions of the output circuit and the load circuit for effecting reclosure of the output circuit breaker, and control means effective to prevent energization of the output circuit until the electrode circuit is completely deenergized by preventing reclosure of the switch means.

4. In a rectifier system, an arc discharge valve having a control electrode and input and output circuits, a circuit breaker operable to connect the input circuit to an alternating current source, a cathode circuit breaker operable to connect the output circuit to an alternating-current load circuit, switch means energizable when the alternating current circuit breaker is closed to render the valve conductive by energizing the control electrode, means responsive to opening of the cathode circuit breaker to effect deenergization of the switch means, reclosing means operable to effect reclosure of the cathode circuit breaker when the voltage conditions of the output and load circuits are in predetermined relation, and control means responsive to energization of the control electrode for preventing reclosure of the cathode circuit breaker until any arc caused by the opening thereof is extinguished, said control means preventing reclosure of the switch means until it has been completely deenergized.

5. A rectifier system comprising, a mercury arc rectifier device having input and output circuits and a control electrode for controlling the conductivity of the device, a circuit breaker for connecting the input circuit to an alternating-current source, a cathode circuit breaker operable to connect the output circuit to a direct-current load circuit, control means for effecting operation of the cathode circuit breaker only when the output circuit voltage and load circuit operating conditions are in predetermined relation, switch means operable only when the alternating-current circuit breaker is closed to connect the control electrode to a source of excitation for rendering the rectifier device conductive, relay means operable whenever the control electrode is connected to the source of excitation, circuit means including auxiliary contact members of the cathode circuit breaker which open before the main contact members for deenergizing the switch means before the main contact members open, and relay means operable when the control electrode is connected to the source of excitation to interrupt the operating circuit of the switch means until the switch means is completely disconnected from the excitation source, whereby reclosure of the cathode circuit breaker is prevented until the interrupting arc is extinguished.

6. In a control system for a mercury pool arc discharge rectifier having an alternating current circuit breaker for connecting it to an alternating current source, a cathode circuit breaker for connecting it to a direct current load circuit, and an excitation control circuit, reclosing means responsive to predetermined conditions of the rectifier and load circuit for closing the cathode circuit breaker, an excitation switch operable under the control of the alternating current and cathode circuit breakers for effecting energization of the control electrode until the cathode circuit breaker opens, and control means operable under the control of the cathode circuit breaker and the excitation switch for preventing reenergization of the excitation switch until the control electrode has been completely deenergized.

7. For use in a control system for a rectifier having a circuit breaker connecting it to an alternating current source, a cathode circuit breaker connecting it to a direct current load circuit and an excitation control circuit, an excitation switch operable when the circuit breaker closes for energizing the excitation control circuit, control means operable in response to closure of the cathode circuit breaker to interrupt the operating circuit of the excitation switch, and circuit means including normally open contact members of the cathode circuit breaker for retaining the excitation switch in the operated position while the cathode circuit breaker remains closed.

MAURICE E. REAGAN.